United States Patent
Chesla (10) Patent No.: US 10,193,919 B2
(45) Date of Patent: Jan. 29, 2019

(54) RISK-CHAIN GENERATION OF CYBER-THREATS

(71) Applicant: Empow Cyber Security Ltd., Ramat Gan (IL)

(72) Inventor: Avi Chesla, Tel-Aviv (IL)

(73) Assignee: Empow Cyber Security, Ltd, Brookline, MA (US)

( * ) Notice: Subject to any disclaimer, the term of this patent is extended or adjusted under 35 U.S.C. 154(b) by 141 days.

(21) Appl. No.: 15/239,258

(22) Filed: Aug. 17, 2016

(65) Prior Publication Data

US 2017/0063917 A1    Mar. 2, 2017

Related U.S. Application Data

(60) Provisional application No. 62/209,031, filed on Aug. 24, 2015.

(51) Int. Cl.
*H04L 29/06*    (2006.01)

(52) U.S. Cl.
CPC ...... *H04L 63/1433* (2013.01); *H04L 63/1416* (2013.01); *H04L 63/1425* (2013.01); *H04L 63/20* (2013.01); *H04L 63/1441* (2013.01); *H04L 63/205* (2013.01)

(58) Field of Classification Search
CPC ............. H04L 63/1416; H04L 63/1425; H04L 63/1433; H04L 63/1441; H04L 63/145–63/1483; H04L 63/20; H04L 63/205; G06F 21/55–21/554
See application file for complete search history.

(56) References Cited

U.S. PATENT DOCUMENTS

| | | | |
|---|---|---|---|
| 7,933,989 B1 | 4/2011 | Barker et al. | |
| 8,150,783 B2 | 4/2012 | Gonsalves et al. | |
| 8,572,750 B2 | 10/2013 | Patel et al. | |
| 8,800,045 B2 | 8/2014 | Curtis et al. | |
| 8,813,234 B1* | 8/2014 | Bowers | G06F 21/552 726/25 |
| 9,141,790 B2* | 9/2015 | Roundy | G06F 21/55 |
| 9,350,750 B1 | 5/2016 | Aval et al. | |
| 2003/0172292 A1 | 9/2003 | Judge | |
| 2004/0114519 A1 | 6/2004 | MacIsaac | |
| 2004/0143756 A1 | 7/2004 | Munson et al. | |
| 2004/0172557 A1 | 9/2004 | Nakae et al. | |
| 2005/0193429 A1 | 9/2005 | Demopoulos et al. | |

(Continued)

OTHER PUBLICATIONS

Friedberg et al., Combating advanced persistent threats: From network event correlation to incident detection, Elsevier, 2014.*

(Continued)

*Primary Examiner* — Minh Dinh
(74) *Attorney, Agent, or Firm* — M&B Analysts, LLC (57) ABSTRACT

A method and system for cyber threat risk-chain generation are provided. The method includes obtaining a plurality of events; mapping each event of the plurality of obtained events to a global threat type, wherein each global threat type is associated with a risk-chain group; correlating among the mapped plurality of events to determine at least a transition between one global threat type to another; and updating a data structure maintaining data of at least one risk-chain, when the transition is determined, wherein the at least one risk-chain is a lifecycle of a cyber-attack.

37 Claims, 7 Drawing Sheets

(56) References Cited

U.S. PATENT DOCUMENTS

| | | |
|---|---|---|
| 2012/0096549 A1 | 4/2012 | Amini et al. |
| 2012/0246727 A1 | 9/2012 | Elovici et al. |
| 2012/0304007 A1 | 11/2012 | Hanks et al. |
| 2013/0198840 A1 | 8/2013 | Drissi et al. |
| 2013/0276122 A1 | 10/2013 | Sowder |
| 2014/0215618 A1 | 7/2014 | Amit |
| 2014/0283026 A1 | 9/2014 | Amit et al. |
| 2014/0283050 A1 | 9/2014 | Amit |
| 2014/0337974 A1 | 11/2014 | Joshi et al. |
| 2016/0057166 A1* | 2/2016 | Chesla .................... H04L 63/02 726/23 |
| 2016/0078365 A1* | 3/2016 | Baumard .............. G06F 21/552 706/12 |
| 2016/0330226 A1* | 11/2016 | Chen ................... H04L 63/1416 |

OTHER PUBLICATIONS

The International Search Report and the Written Opinion of the International Searching Authority for PCT/US2015/039664, ISA/RU, Moscow, Russia, dated Oct. 15, 2015.
The International Search Report and The Written Opinion of the International Searching Authority for PCT/US2015/060109, ISA/RU, Moscow, Russia, dated Mar. 10, 2016.
Ross, "Malware Analysis for the Enterprise", 25 Pages (Year: 2010).

* cited by examiner

| Chain ID | | | | | | | | | | | | |
|---|---|---|---|---|---|---|---|---|---|---|---|---|
| Seg.ID | Time stamp 503 | Orig phase, (SDE) 504 | Global threat type 505 | Event and count 506 | Network classification | | Seg. risk 509 | Flow state 510 | C&E counter 512 | Attack risk 514 | Age 516 |
| | | | | | Seg. Src 507 | Seg. Dst 508 | | | | | |
| 1 | | | | | | | | | | | |
| 2 | | | | | | | | | | | |
| 3 | | | | | | | | | | | |

FIG. 7 ized Patent Application No. 62/209,031 filed on Aug. 24,
RISK-CHAIN GENERATION OF CYBER-THREATS

CROSS-REFERENCE TO RELATED APPLICATIONS

This patent application claims priority from U.S. Provisional Patent Application No. 62/209,031 filed on Aug. 24, 2015, the contents of the which are hereby incorporated by reference.

TECHNICAL FIELD

The present disclosure generally relates to cybersecurity systems, and more particularly to cyber-security systems for automatically generating of risk of cyber-threats.

BACKGROUND

The Internet provides access to various pieces of information, applications, services, and the like for publishing information. Today, the Internet has significantly changed the way we access and use information. The Internet allows users to quickly and easily access services such as banking, e-commerce, e-trading, and other services people access in their daily lives.

In order to access such services, a user often shares his personal information such as name; contact details; highly confidential information such as usernames, passwords, bank account numbers, and credit card details; and so on with service providers. Similarly, confidential information of companies such as trade secrets, financial details, employee details, company strategies, and the like are also stored on servers that are connected to the Internet. There is a threat that confidential and/or personal information will be accessed by hackers using unauthorized access methods. Specifically, such methods include, for example, using malware, viruses, spyware, key loggers, compromised remote desktop services, and the like.

Recently, the frequency and complexity level of attacks has increased with respect to attacks performed against all organizations including, but not limited to, cloud providers, enterprise organizations, and network carriers. Some complex attacks, known as multi-vector attack campaigns, utilize different types of attack techniques to identify weaknesses in the target network and/or application resources. Identified weaknesses can be exploited to achieve the attack's goals, thereby compromising the entire security framework of the network.

One example for a relatively new type of multi-vector attack campaign is an advanced persistent threat (APT). An APT is an attack in which an unauthorized hacker gains access to a network and remains undetected for a long period of time. Due to the complexity of multi-vector attack campaigns, such attacks are frequently successful and are not detected by current security solutions. This is due to the fact that current security solutions are not sufficiently agile and adaptive with respect to detection, investigation, and mitigation of resources needed to meet such evolving threats. Specifically, this is due to the fact that current security solutions cannot easily and promptly adapt to detect and mitigate new attack behavior or attacks that change their behavior in a significant manner in order to bypass the security.

In addition, security solutions and, in particular, solutions for APT attacks, do not provide reliable automatic decision-making capabilities. Typically, security solutions are not designed for both detection and automatic decision-making. In addition, system administrators do not trust currently available security solutions' designs to mitigate complex attacks due, in part, to the high level of false positive alerts generated by such systems because of inaccurate mitigation control. As a result of such false positive alerts, system administrators often manually perform decision-making processes rather than permit automatic decision-making, which usually increases the time needed to mitigate attacks.

Moreover, current solutions cannot predict potential risks such as future activities that are associated with pre-attack intelligence gathering, malware propagation, data breach, and exfiltration of data. Current solutions also suffer from a lack of situational awareness of the main risks and loss potential that attacks can impose on a business. Furthermore, due to the lack of automatic decision-making, investigation, remediation and/or mitigation actions are not well defined and prioritized, thereby resulting in inefficient utilization of security resources such as investigation resources and mitigation resources.

It would therefore be advantageous to provide a security solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method and system for cyber threat risk-chain generation are provided. The method comprises obtaining a plurality of events; mapping each event of the plurality of obtained events to a global threat type, wherein each global threat type is associated with a risk-chain group; correlating among the mapped plurality of events to determine at least a transition between one global threat type to another; and updating a data structure maintaining data of at least one risk-chain, when the transition is determined, wherein the at least one risk-chain is a lifecycle of a cyber-attack.

Some embodiments disclosed herein include a system for cyber threat risk-chain generation. The system comprises a processing circuitry; and a memory, the memory containing instructions that, when executed by the processing circuitry, configure the system to: obtain a plurality of events, wherein each event is generated by a security application; map each event of the plurality of obtained events to a global threat type, wherein each global threat type is associated with a risk-chain group; correlate among the mapped plurality of events to determine at least a transition between one global threat type to another; and update a data structure maintaining data of at least one risk-chain, when the transition is determined, wherein the at least one risk-chain is a lifecycle of a cyber-attack.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include a risk-chain detection mechanism configured to automatically detect multi-vector attack campaigns. The disclosed mechanism can further pin-point network elements and associated traffic flows that are part of an attack campaign. A risk-chain is a cyber-attack (attack) lifecycle that defines different stages in a detected multi-vector attack campaign. In an embodiment, detection of a risk-chain is achieved through processing of events. In a further embodiment, each identified risk-chain is associated with an attack risk level. In yet another embodiment, the attack lifecycle is monitored using a state machine utilized by a respective generated risk-chain.

Figure 1:
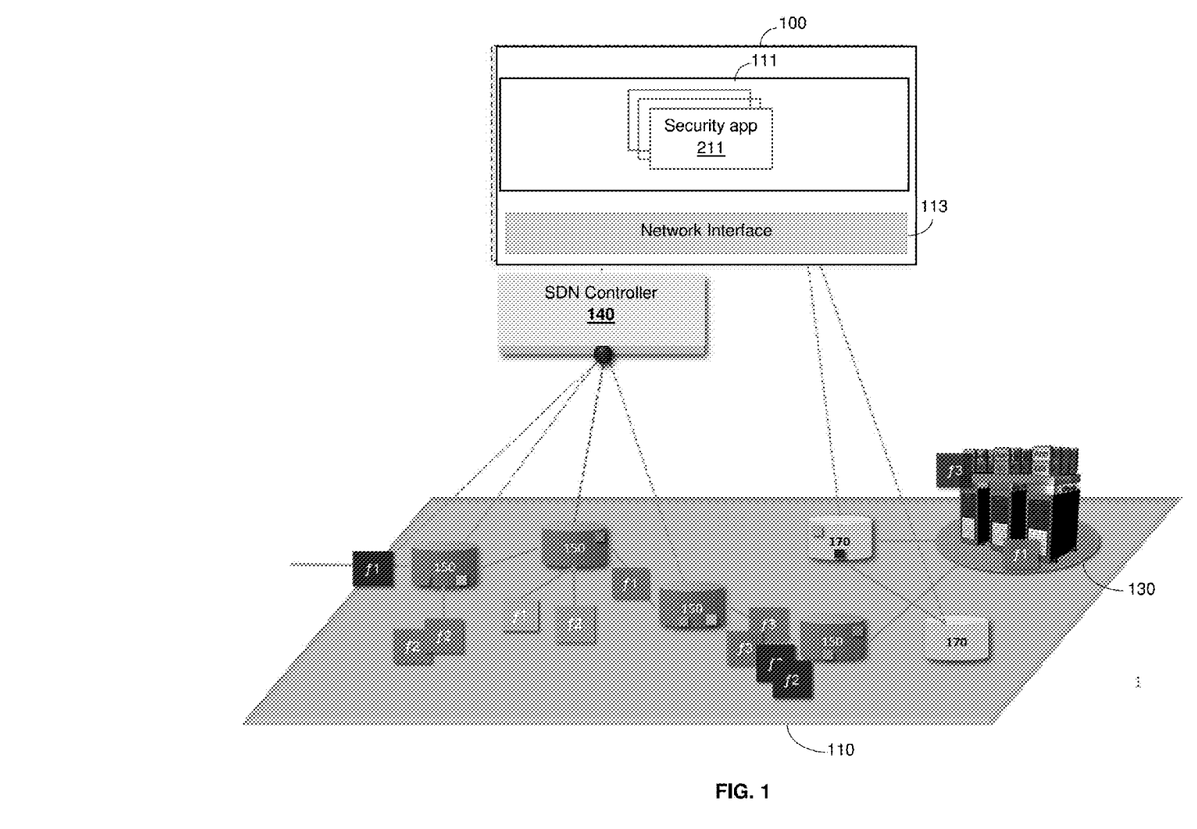
FIG. 1 is a diagram of a cyber-security system utilized to describe the various disclosed embodiments.

FIG. 1 is an example diagram of a cybersecurity system 100 implemented according to one embodiment. The cybersecurity system 100 is configured to protect at least one object (hereinafter a "protected object") 130 communicatively connected in a network 110. The cyber security system 100 is also connected to the network 110. In an embodiment, the system 100 is configured to protect the objects 130 through orchestration of a plurality of security products 170 deployed in the network 110.

A protected object 130 may include, for example, a L2/3 network element, a server application (e.g., Web, Mail, FTP, Voice and Video conferencing, database, ERP, and so on), "middle box" devices (e.g., firewalls, load balancers, NAT, proxies devices, etc.), SDN controllers (e.g., OpenFlow controllers and virtual overlay network controllers), personal computing devices (e.g., PCs, laptops, tablet computers, smartphones, wearable computing devices, a smart TV, and other devices with internet connectivity (IoT)), and the like. The network 110 may be, but is not limited to, a virtualized network, a software defined network (SDN), a hybrid network, a cloud services network, or any combination thereof.

A SDN can be implemented in wide area networks (WANs), local area networks (LANs), the Internet, metropolitan area networks (MANs), Internet service providers (ISP) backbones, datacenters, and the like. Each network element in the SDN may be a router, a switch, a bridge, a load balancer, a DPI device, and so on, as well as any virtual instantiations thereof. Typically, elements of the SDN include a central controller 140 and a plurality of network elements 150. In certain implementations, the SDN controller 140 communicates with the network elements 150 using, for example, an OpenFlow protocol, a Netconf protocol, and the like. In an example configuration, the network 110 may be a hybrid network in which a SDN is a sub-network of a conventional network including elements that cannot be programmed by a central controller 140.

In one embodiment, the cybersecurity system 100 is configured to interface with the network 110 through the central controller 140. In another embodiment, the functionality of the cybersecurity system 100 can be integrated in the central controller 140. Alternatively, the functionality of the cybersecurity system 100 is configured to communicate directly with the network elements 150 over a data-plane. This allows implementation of security functions in various locations in the network 110 (e.g., SDN, legacy (non-SDN) networks, or hybrid networks) to protect the protected objects 130.

In an embodiment, security functions are programmed by the cybersecurity system 100 to perform detection, investigation, and mitigation functions (labeled as f1, f2, and f3, respectively, in FIG. 1). The functions are executed during different phases of the operation of the cybersecurity system 100, i.e., detection, investigation, and mitigation phases and independently programmed by the cybersecurity system 100. It should be noted that some or all the functions ($f_1$, $f_2$, and $f_3$) can be implemented or otherwise performed in the network 110.

In an example implementation, the cybersecurity system 100 includes a security stack module 111 and a network interface 113. The security stack module 111 is configured to control and execute the various phases to protect the protected objects 130. Specifically, the security stack module 111 is configured to create, control, program, execute the security functions ($f_1$, $f_2$, and $f_3$) through a plurality of security applications or "apps,", 211. The security stack module 11 is also configured to collect attack logs as generated by the security products 170, and filter such logs.

The security stack module 111 is arranged as a layered model allowing the cybersecurity system 100 to adapt to changes in the protected objects 130 and to ongoing attack campaigns. The security stack module 111 includes in part a collection of security applications 211 and security services (security services not shown in FIG. 1). A security application 211 defines how to detect, investigate and mitigate a threat to a protected object 130, which specific resources should be utilized for the protection, where the protection should take place, in what order and so on. A security application 211 can be defined using a set of security services as discussed in more detail herein below.

In an embodiment, the cybersecurity system 100 is configured to allow the creation, definition, or programming new security applications, to modify the functionality of existing applications, and to easily correlate and create workflows between multiple applications. To this end, security applications 211 and services can be shared or collaborated across different cyber security systems of the same or different companies. A plurality of security applications 211 can be utilized to detect and mitigate an on-going attack campaign. The operation of the security stack module 111 is discussed in greater detail herein below with respect to FIG. 2.

The network interface 113 provides an interface layer of the cybersecurity system 100. Such communication can be with SDN-based network elements or "legacy" network elements (not shown) in the network 110. The network interface 113 supports bi-directional communication drivers to allow communication with the data-plane elements including configurations, policy reading, and logs collection. The drivers support different forms of communication standards and vendors' defined interfaces such as, but not limited to, Netconf, Netflow, BGP, BGP flow spec, SSH, CLIs, DB APIs and more. The drivers enable communication with middle-box devices (e.g., L4-L7 devices and security devices, DPI devices, etc.), end point devices (mobile, host based security applications), server applications, management systems of these devices, combinations thereof, and so on.

The network interface 113 also interfaces with the plurality of security products 170. Such security products 170 are designed to protect against different cyber threats. The security products 170 are utilized to collectively handle a family of cyber threats, and may include, for example, an IDS, an anti-virus, anti-malware, a web application firewall (WAF), a network behavior analysis, and the like. The security products 170 may be provided by the same or different vendors.

In an embodiment, the cybersecurity system 100 is configured to orchestrate the operation of the various security products 170 through execution of the security applications 221. The execution of such applications requires events generated by the security applications. Such events are generated in response to data (e.g., attack logs) received from the security products 170. Such signals, and therefore the events, are generated in response to detecting at least behavior, activity, and the like that indicate a potential attack on the usage of any monitored protected object in the network.

According to the disclosed embodiments, the cybersecurity system 100, in part, using the security stack module 111, is configured to detect risk-chains of multi-vector attacks and to determine an attack risk level for each such risk-chain. As noted above, a risk-chain is an attack lifecycle that may define different stages in a detected multi-vector attack campaign. In an embodiment, the cybersecurity system 100 is configured to locate, based on a risk-chain, network elements, traffic flows, or both, that are associated with an attack campaign.

A multi-vector attack campaign can be detected or identified by a risk-chain indicating cyber-attacks, such as, but not limited to, an insider threat campaign, a personal data-leak campaign, a ransomware campaign, an intelligence gathering, financial data-leak campaigns, a denial-of-service (DoS) or distributed DoS (DDoS) attack campaigns, and so on.

In an embodiment, the cybersecurity system 100 is configured to generate a risk-chain for a specific threat by correlating events generated by the security applications 211 in the security stack module 111. The correlation is performed in part to determine if an attack has advanced from one global threat type (e.g., propagation) to another (e.g., action). Such transition indicates a different stage in the attack campaign. The processing of events for generating risk-chains are discussed in greater detail below.

According to an embodiment, the cybersecurity system 100 is designed to activate, deactivate, and correlate between security applications 211 in order to define, create, or otherwise program a robust solution for detecting and mitigating attacks against the protected object.

In an embodiment, a sequence for activating, deactivating, and correlating the various functions and modules of the cybersecurity system 100, is based on one or more workflow rules (of the application tenant) and the respective risk-chains. A workflow rule and generated risk-chain may define, e.g., scopes of operation of the various phases' functions (investigation phase functions, mitigation phase functions, etc.).

Each security application 211 is configured to correlate events received from other security applications 211, thereby making the security decision-making process holistic and context-based. That is, each security application 211 is configured to correlate decision outputs from different security application types before making a final security decision.

The correlation of various events is based on a set of workflow rules which are processed and applied by a security application 211. In an embodiment, the set of workflow rules are defined by the user. In another embodiment, a security application is configured to perform machine learning to define or otherwise select a set of workflow rules to execute. In yet another embodiment, a security application 211 can override workflow rules or define new workflow rules based on the generated risk-chains. The workflow rules are set respective of the attacks that the cybersecurity system 100 can handle. That is, in an example implementation, a set of workflow rules is defined for each different type of threat.

Figure 2:
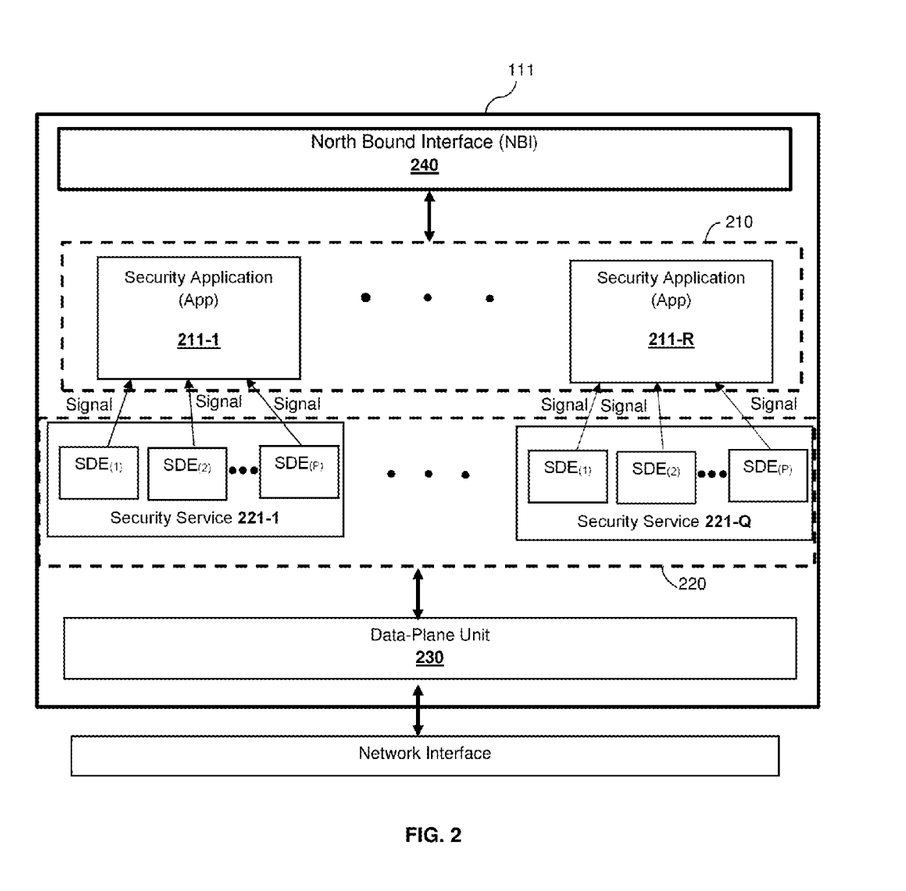
FIG. 2 is a block diagram of a security stack module implemented according to an embodiment.

FIG. 2 shows an example block diagram of the security stack module 111 implemented according to one embodiment. In an example implementation, the security stack module 111 includes the following units: a security application unit 210, a security services unit 220, a data-plane unit 230, and a northbound network interface (NBI) 240.

The security services unit 220 hosts a plurality of security services 221-1 through 221-Q (hereinafter referred to individually as a security service 221 and collectively as security services 221, merely for simplicity purposes) being reusable across different security applications 211-1 through 211-R (hereinafter referred to individually as a security application 211-1 and collectively as security applications 211, merely for simplicity purposes). Thus, different security applications 211 (each one for a different purpose) can utilize the same or different security services 221 for their respective needs.

The security application unit 210 includes the security applications (apps) 211. Each security application 211 represents a different type of security protection or function. For example, a security application 211 can be configured to handle an insider threat campaign, a personal data-leak campaign, a ransomware campaign, an intelligence gathering, financial data-leak campaigns, a denial-of-service (DoS) or distributed DoS (DDoS) attack campaigns, and so on. Each security application 211 can be updated according to evolving security needs. Updating the security application 211 may include, but is not limited to, reconfiguring the security application 211. In an embodiment, the security application unit 210 is preconfigured with a set of security applications 211. Additional security applications 211 can be added or removed from the security application unit 210 as needed.

In an embodiment, a security service 221 represents a cyber-solution category. A security service 221 can execute a plurality of logical security functions defined to handle a specific cyber-solution category. Each such category typically utilizes different types of security technologies and thus supports different types of attack detection, investigation, and/or attack mitigation rules.

Examples of security services 221 that can be maintained and executed by the security services unit 220 include an NBA anomaly security service, an anti-malware (e.g., sandbox) security service, a reputation security service, an IDS security service, a challenge-response security service, an anti-virus (AV) security service, and a Web application (WAF) security service. Examples for the functionality of the security services 221 can be found in co-pending U.S. patent application Ser. No. 14/615,020 (hereinafter the '020 application) to Chesla, assigned to the common assignee, which is hereby incorporated by reference for all that it contains.

Each security service 221 includes one or more security decision engines $SDE_{(1)}$ through $SDE_{(P)}$. The SDEs may be programmable or preconfigured. A security service 221 is configured to use a set of pre-defined SDEs, import SDEs, create a new security decision engine and shares, or a combination thereof. A SDE represents a logical threat protection category within the security service. The creation and modification of such SDEs can be performed via a programming language, threats classification processes designed to automatically populate an SDE with security rules (e.g., IDS attack signature rules) per threat, and so on. The security decision engines, and therefore the security services 221, can allow the cybersecurity system 100 to adapt to new threats, new attack behaviors, unknown behaviors, or attacks that utilize new evasion techniques.

A security service 221 is configured to generate a plurality of signals based on its various SDEs. Such signals are generated in response to detecting at least behavior, activity, and the like that indicate a potential attack or the usage any monitored protected object in the network. In order to generate signals, each SDE is configured to receive and process traffic flows, alerts, logs, and security rules provided by any network element (150, FIG. 1) and/or security products (170, FIG. 1). Such information is received at the security services 211 through the data-plane unit 230 and north bound interface 240.

The data-plane unit 230 provides central control of the data-plane resources, such as routers, switches, middle-box L4-L7 and security devices, and so on. In an embodiment, the data plane unit 230 is configured to allow the security services 221 to retrieve and store the required network and application information from such data plane resources as well as to enforce security network control actions.

The data-plane unit 230 can perform networking functions such as topology discovery, traffic monitoring (copy services), traffic redirection functions, traffic distribution (L2, L3 load balancing for scaling out resources), management of quality of service (QoS) actions in the network elements, and the like. In some example implementations, certain functions provided by the data-plane unit 230 can be implemented in the central SDN controller 140. Examples for such functions may include, but are not limited to, redirection, copy, QoS, and data collection.

The north bound interface 240 is configured to interface between the security stack module 111 and one or more external systems or elements (not shown). The external systems may include, for example, third party security analytics systems, security portals, datacenter orchestration systems, identity management systems (e.g., domain controllers, DNS, DHCP, etc.), or any other system or element that can provide information to the security stack module 111. This enables a wider context-based security decision making process.

The north bound interface 240 may include standard interfaces, such as CLI, REST APIs, Web user interface, as well as drivers that are already programmed for control, configuration, monitoring, or a combination thereof of specific third party systems, and so on.

The various units and modules of as well as the security stack module 111 are communicatively interconnected through a predefined set of interfaces APIs, or both. As a result, the cybersecurity system 100 is fully programmable and configurable. The interfaces and APIs may be designed to be unidirectional, bidirectional, or one-to-many bi-directional flows of information.

According to the disclosed embodiments, each security application 211 is configured to generate risk-chains. In addition, for each generated risk-chain, a security application 211 is configured to compute or determine a risk level for each segment in the risk-chain and an attack risk level for the risk-chain.

To this end, a security application 211 is configured to generate events based on signals received from one or more of the security services 221. The events are generated using of a set of event rules. Event rules 620 can be applied to a signal's value, a duration, a frequency, and so on, or any combination thereof. The generation of events in response to signals are discussed in greater detail in the above-referenced '020 Application.

In an optional embodiment, the generated events are filtered based on a set of events filters assigned for each tenant. Events that are filtered out will not be processed through the generation of risk-chains. The filters may be set to be loose or strict. Loose filters will result with more events relative to strict filters.

Then, a security application 211 is configured to process the (un-filtered) events using a set of risk-chain generation (RCG) rules. The RCG rules may be specific for each application 211, for each specific tenant (protected object) protected by an application 211, for each attack-type, for a combination thereof, and so on. As will be discussed in detail below, the set of RCG rules includes grouping rules, mapping rules, and matching rules applied on the received events.

As noted above, according to the disclosed embodiments, a security application 211 is configured to automatically identify network elements and their associated traffic flows that take part in an attack against the protected objects. Such identification is based on the segments of each risk-chain. In yet another embodiment, a security application 211 is configured to monitor an attack lifecycle through a state machine of a respective risk-chain.

The generated risk-chains are helpful for detecting and mitigating APT attack campaigns. This is mainly due to the fact that, during APT attack campaigns the attack includes different stages and multi-vector attacks within each stage, that involves many independent network elements participating in an attack. Detection of the various vectors within and cross attack stages involve many security solutions, typically silos (not integrated with others), and therefore the relation between any two or more malicious activities is not immediately apparent. A risk-chain can be utilized to determine the source, destination, current, and future malicious activity, thereby enabling detection, investigation, and mitigation of the attack by applying automated decisions taken respective of the risk-chains. The operation of a security application 211 for generating risk-chains is discussed in more detail herein below with respect to FIG. 3.

It should be noted that modules in the cybersecurity system 100 and the units 210, 220, and 230 in the security stack module 111 are independent. Thus, any changes in one unit or module do not necessarily result in any changes to the other modules.

Each, some, or all of the modules of the cybersecurity system 100 and the various units of the security stack module 111 may be realized by a processing circuitry or system. The processing circuitry may comprise or be a component of a larger processing circuitry implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The processing circuitry may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 3:
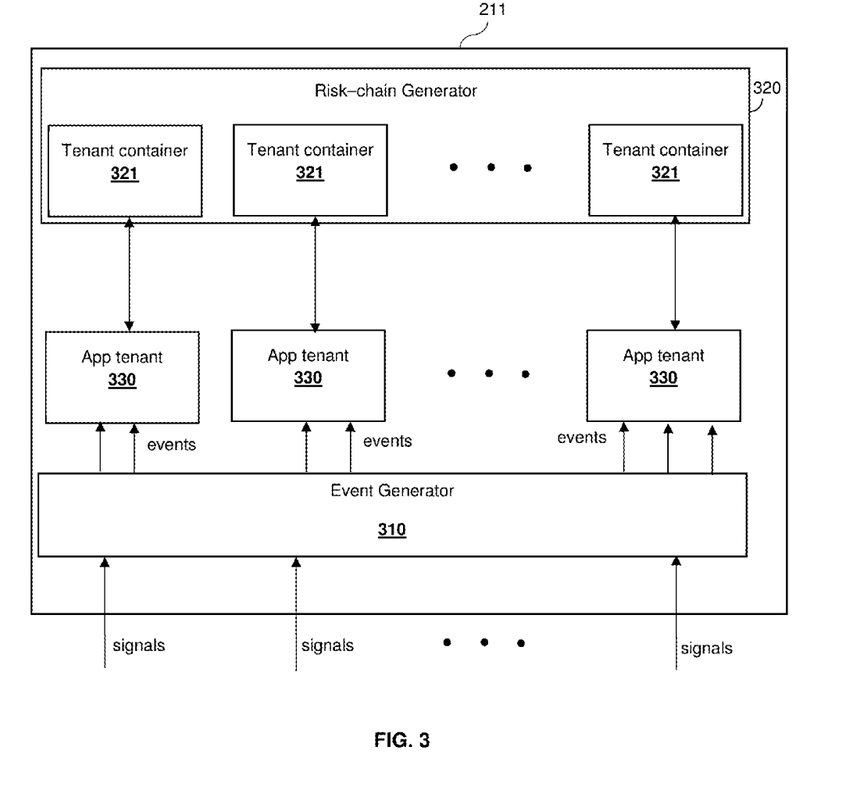
FIG. 3 is a diagram illustrating the operation of a security application for generating risk-chains according to an embodiment.

FIG. 3 shows an example diagram illustrating the operation of a security application 211 for generating risk-chains according to an embodiment. The security application 211 includes at least an event generator 310 and a risk-chain generator 320. The risk-chain generator 320 is configured to at least generate risk-chains, compute their risk levels, and identify elements and traffic flows associated with each risk-chain.

In some embodiments, the security application 211 is configured to generate risk-chains for a specific tenant. In such embodiments, the security application 211 is configured with a plurality of application (app) tenants 330, each of which is associated with a different tenant. In addition, the risk-chain generator 320 is configured with a plurality of tenant containers 321, each of which is associated with an application tenant 330. In an embodiment, a tenant is a protected object (e.g., one or more of the objects 130).

The event generator 310 is configured to interface with the security services 221 to collect or otherwise receive signals. The event generator 310 is also configured to generate events based on the received signals and the event rules. The event generator 310 is further configured to distribute the events among the different application tenants 330 based on the events' relevancy to a specific application tenant 330. The relevance to a specific application tenant 330 may be based on, but not limited to, the IP address of the tenant. For example, an event with a source IP address "XYZ" will not be sent to an application tenant of a tenant having an IP address "ABC".

Each application tenant 330 may initially filter incoming events using filters for determining each event's relevancy or severity and may forward all or some of the incoming events to a respective tenant container 321. In addition, each application tenant 330 can receive, from the risk-chain generator 320, risk-chains generated for the respective tenant.

Each tenant container 321 aggregates the received events. In an embodiment, the risk-chain generator 320 is configured to analyze events in a respective tenant container 321 to generate a risk chain. The analysis, in an embodiment, is performed using a set of RCG rules, which are logical rules defined for a respective tenant, for a type of cyber-attack, or for a combination thereof. In an example embodiment, the RCG rules include: mapping rules to map events to a global threat type and grouping events with the same threat type in a container 321, and matching rules to identify correlations between group of events.

Mapping rules are designed to map grouped events to a global threat type. A global threat type defines a certain type of malicious activity and may include, for example, an action, control, propagation, probe, and social engineering. In an embodiment, the mapping is based on a threat characteristic which is determined based on the type of SDE within the security service 221 that was responsible for detecting the threat. For example, events that represent an action will be mapped into an action global threat type. Such events can result from signals related to data-exfiltration patterns, drop zone activity behavior, or DoS, which are respectively detected by ab exfiltration pattern SDE (of an IDS security service), a drop zone SDE (of a NBA security service), or a DoS SDE (of an IDS security service).

In an embodiment, the events are mapped using a classifier trained using a classification model representing attack logs of security engines, threat types, or both. Any event can be mapped or classified to a respective threat based on the global threat type.

Each attack-type can be represented with one or more global threat types. For example, an APT campaign is a multi-stage attack, where each stage in the attack may be represented by a different global threat type.

In one embodiment, a global threat type is associated with a risk-chain group. The risk-chain group may include, for example, effect only, cause only, and cause-and-effect. In an example configuration, a global threat types of: action, control, propagation, probe, and social engineering are respectfully associated with the following risk-chain groups: effect only, cause-and-effect, cause-and-effect, cause-and-effect, and cause only.

The cause risk-chain group includes all events that can trigger another event(s) in a different risk-chain group (e.g., an effect group). The effect risk-chain group includes all events that are considered to result from event(s) classified to the cause risk-chain group. The cause-and-effect group includes events that are both the cause of and result of another event(s). Each of the cause-and-effect group events may be the cause of one or more events, and may be the result of one or more other events, that is, any or all of the causes of a cause-and-effect group event may not be the result of the cause-and-effect group event.

The matching rules are defined, per global threat type, to correlate between events. In an embodiment, the matching rules are applied on events mapped and grouped into a global threat type to detect transitions from one global threat type to another. A transition may be a change from one global threat type to another or a self-loop, i.e., repeated event of the same threat group. Each such transition is a segment (new or updated) in the risk-chain. The transition is a state action in a state-machine utilized to maintain a life-cycle of the risk-chain.

The matching rules are further defined to determine a risk level for a segment. A segment risk level determines correlation strength between "cause" and "effect" of each combination of global threat types (e.g., propagation to action).

In an embodiment, the segment risk level is based on any of, or a combination of: a transition from global threat type to another, a risk-chain group, an attack type, and network relationships. The segment risk level may be set to a low, high, or medium level. Alternatively, the segment risk level may be a numerical value (e.g., an integer number from 0-9).

A matching rule is defined with at least one matching condition. The matching rule is satisfied when one or more of the defined matching conditions are met. As an example, the matching conditions may apply on an entity type, a device type, a device group, an event order, and the like. In an example embodiment, a matching rule may be presented as follows:

$$\text{If } MC_1 \oplus MC_2 \oplus \ldots MC_p;$$
$$\text{then}$$
$$\text{Segment\_Risk\_Level} = L_1; \text{ and}$$
$$\text{State\_Action} = \text{TRANSITION}$$

The parameters $MC_j$ (j=1 ... p) are matching conditions, the operator $\oplus$ is a logical operator that may be OR, AND, NOT, XOR, and the like. The Segment_Risk_Level and State_Action parameters are the segment risk level and state action, respectively, that are discussed above.

In an embodiment, a matching condition of an entity type may be a source or destination of an event. The source and destination may be designated by a host name, an IP address, a user name, a group of IP addresses, a port number, a L4 protocol, a L7 protocol, and the like.

The device type matching condition indicates whether the match criteria refer to a specific host. A host may be defined by its host name or by a host IP address. The device group matching condition indicates if the matching condition should be applied to a single device (e.g., a host) or to a group of devices (group of hosts). When applied on a group of devices, then the matching rule, once processed, can be utilized to identify correlations between any two devices in two different groups of devices. In an embodiment, the device group is part of the device type matching condition.

The event order matching condition indicates if the matching should be sensitive to the times at which the events occurred or were generated. It should be noted that any of the matching conditions of event order, a device group, and a device type, may be set with a binary value.

The following example table (Table 1) demonstrates matching rules for correlating events transitioning from a Propagation to Action global threat type.

TABLE 1

| MC | Entity Type | Device Type | Event Order | Device Group | Segment Risk Level | State Action |
|---|---|---|---|---|---|---|
| 1. | Same Destination; and Different Source | Host | Yes | N/A | Low | Transit |
| 2. | Source = Destination | Host | Yes | N/A | High | Transit |
| 3. | Same Destination; and Same Source | Host | Yes | N/A | Med | Transit |

In the first example matching rule (1), the matching conditions are same destinations and different sources as an entity type; a host as a device type; and that the event order is required. Matching rule (1) will be satisfied if the events (those that are mapped to Propagation and those that are mapped to Action) should have the same destination (and different sources), where a first event (mapped to a propagation threat type) should have occurred before a second event (mapped to an action threat type). The matching rule relates to a device type Host. Because in this case the correlation between propagation and action is not certain, the segment risk level is set to a low level.

The matching rule (1) may identify cases where an attacker took control over a host through a remote desktop channel (e.g., indicated by an abnormal remote admin tool activity event) and, subsequently from another host (indicated by a file upload event) that attempted to upload a file to the same destination host.

In the second example matching rule (2), the matching conditions are: the source of an event is the same as the destination of another event; a host as a device type; and that the event order is required. If the matching rule (2) is satisfied, then a second event (mapped to an Action threat type) should originate from a source that is equal to the destination of a second event (mapped to a Propagation threat type). In addition, the first event should have occurred before the second event. The matching rule relates to a host device. The correlation here demonstrates a clear cause-and-effect case; thus the segment risk level is set to a high level.

The matching rule (2) may identify cases such as memory scraper malware (reported by a malware detection event) propagated into a host device, which subsequently sends confidential information that was "scraped" from that host device's memory into another host (indicated by an action event). In this case, the destination of the propagation is the same as the source of the leak (i.e., the host sending the information).

In the third example matching rule (3), the matching conditions are: same destination and same source as an entity type; a host as a device type; and that the event order is required. The matching rule (3) is satisfied when two events have the same destination and source; and a first event (mapped to propagation) occurred before a second event (mapped action). The matching rule (3) relates to a specific host. The segment risk level is set to a medium (med) level.

The matching rule (3) may identify cases where the same source host establishes an abnormal remote desktop channel (indicated by a remote channel event) and then a file upload (indicated by an abnormal file upload event) to the same host (destination). The remote channel event is a propagation threat and the file upload event is an action threat. Thus, the matching rule (3) correlates between propagation and action events.

The following example table (Table 2) demonstrates matching rules for correlating repeated events mapped (or classified) to the same global threat type. In this example, the global threat type is an action type.

TABLE 2

| MC | Entity Type | Device Type | Event Order | Device Group | Segment Risk Level | State Action |
|---|---|---|---|---|---|---|
| 4. | Same Destinations | 'Host | N/A | N/A | Med | Self-loop |
| 5. | Source = Destination | Host | Yes | N/A | High | Transit |

In the example matching rule (4), the matching conditions are: same destinations as an entity type; a host as a device type; and that the event order is not required. If the matching rule (4) is satisfied, the events should have the same destination address of a host (and different sources). The segment risk level is set to a medium (med) level.

The matching rule (4) may identify cases where activity on the same destination entity is determined, for example, infected hosts send confidential data to another host (e.g., to a drop zone host), or attempt to cause a DoS to the other host. As a result, the destination entity can be considered as a host that is under high risk (targeted by different entities), or a host that has become critical, and should be investigated, because confidential data has been leaked to such host.

In the example matching rule (5), the matching conditions are: destination of one security event should be equal to the source of another event (i.e., the targeted entity become a source of an event); a host as a device type; and that the event order is required. If the matching rule (5) is satisfied, a source of a second event is the same as the destination of a first event, where events relate to a host address of a device. In addition, the first event should occur before the second event. In this case, all events are classified as an action global threat. The segment risk level is set to a high level. The matching rule (5) may identify cases where a chain data leakage activity occurs. That is, cases where stolen confidential data is forward from one drop-point to another.

Upon processing the events, in a tenant container, using the RCG rules, the risk-chain generator 320 outputs a risk-chain. A risk-chain is constructed to include the global threat types and segments. A segment may represent a transition from one global threat type to another or a self-loop in a global threat type. A segment may be, for example, a transition from a propagation to action global threat type.

A segment may be maintained or otherwise displayed with a set of parameters including at least a segment ID, segment risk level, a respective event (or events), a global threat type, and the like. In addition, a risk-chain may be associated with an attack risk level. The attack risk level may be based on, but not limited to, a function of any of the segments' risk levels, a number of segments, and a cause-and-effect counter value. Any risk-chain generated using the disclosed embodiments represents a cyber-attack or a phase during an attack.

In another embodiment, each global threat type may be maintained with a metadata including events designated entities (e.g., hosts) that caused or affected the respective threat type. Therefore, in an embodiment, a risk-chain can be also presented as a set of entities and logical connections between such entities. The logical connections are based on the events generated by the security application.

Figure 4:
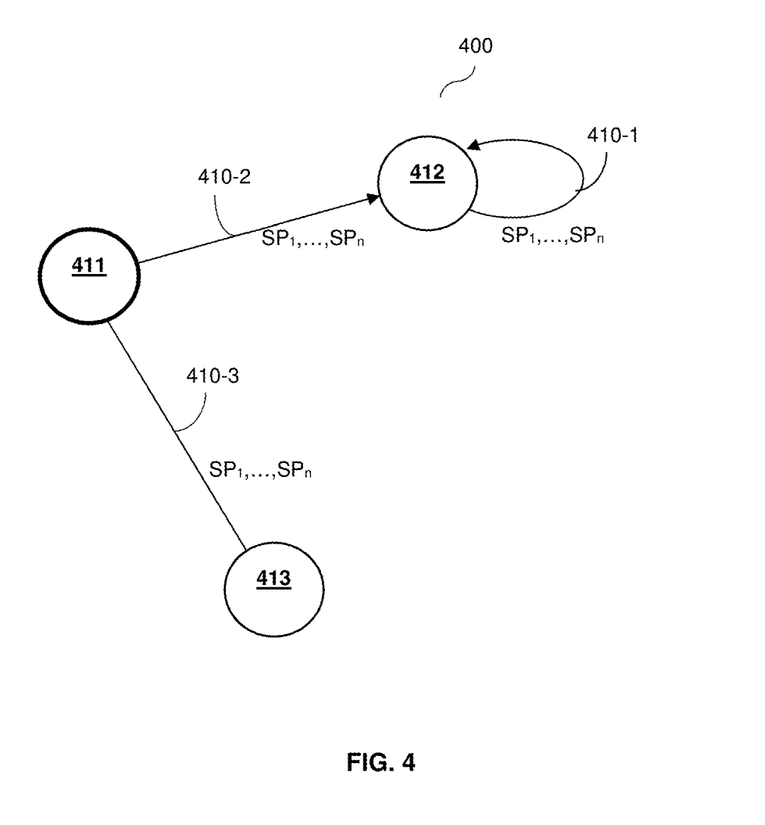
FIG. 4 is a schematic diagram of a risk-chain pattern.

An example diagram illustrating a risk-chain 400 is shown in FIG. 4. The risk-chain 400 includes three segments 410-1, 410-2, and 410-3. Each segment is created in response to satisfying a matching rule as defined in greater detail below. The nodes (vertices) 411, 412, and 413 include the global threat types. For example, nodes 411, 412, and 413 are a probe threat type, a propagation threat type, and an action threat type, respectively. The segments 410-2 and 410-3 represent transitions from one type of threat to another. The segment 410-1 is a self-state segment. Each of the segments 410-1, 410-2, and 410-3 is maintained or displayed with its respective segment parameters ($SP_1, \ldots, SP_n$).

It should be noted that any generated risk-chain can be updated as new events are gathered in the respective container. Aging risk-chains are ignored or deleted. In an embodiment, the risk-chain generator 320 is configured to maintain a data structure including at information related to a risk chain. An example for such a data structure is described further herein below with respect to FIG. 5.

Returning to FIG. 3, in an embodiment, the risk-chain generator 320 is configured to operate in two different modes: regular and pro-active. In the regular mode, the risk-chain generator 320 is configured create risk-chains using predefined sets of RCG rules and the predefined workflow rules. In the pro-active mode, the risk-chain generator 420 may override, based on the generated risk-chains, some of the predefined event-correlation rules, workflow rules, or both. In the pro-active mode, and in order to make pro-active security decisions, the risk-chain generator 320 is configured to control security functions (e.g., investigation, and mitigation) performed by the respective security application 211.

For example, the risk-chain generator 320 may cause or instruct a security application 211 to make an early transition from a detection phase to an investigation phase, to initiate a mitigation phase before the pre-defined event-correlation rules, workflow rules, or both of the application are met, and to send instructions to initiate these phases. In an embodiment, such a control can be achieved by overriding some of the workflow rules, event-correlation rules, or a combination thereof, executed by each security application based on the information learned from the risk-chains. The event-correlation and workflow rules are further discussed in the above-referenced '020 application.

It should be noted that information between different tenant containers 321 in the same security application or in different security applications 211 can be shared in order to create and update a higher level risk-chain. That is, cross tenant risk chains, cross application risk-chains, or both may be generated according to the disclosed embodiments.

Figure 5:
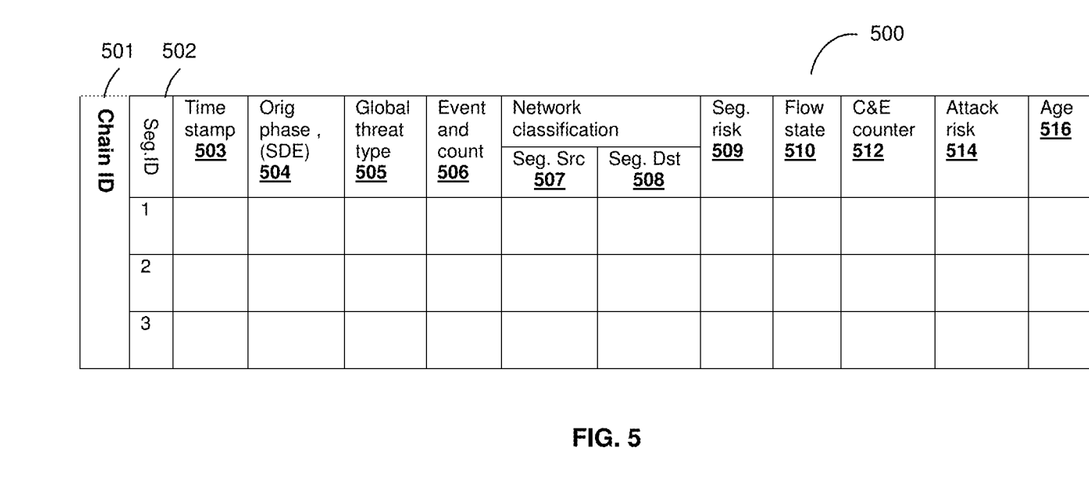
FIG. 5 is a data structure utilized to maintain information according to an embodiment.

FIG. 5 shows an example data structure 500 utilized to maintain information on generated risk-chains. The data structure 500 is utilized to create, update, and terminate risk-chains. The data structure 500 includes all relevant information about each risk-chain.

A lifecycle of a risk-chain and hence of an attack can be maintained based on the information stored in the data structure 500. In an embodiment, the data structure 500 is configured as a table, where each row represents a segment of a risk-chain. The data structure 500 is maintained in the context of an application tenant.

The fields maintained by the data structure 500 will now be explained. The chain ID 501 is a unique ID assigned to each risk-chain. During the process of updating each risk chain, events that meet the matching rules (per each chain ID) are processed and added to the associated risk-chain, and the risk-chain pattern is updated accordingly. Updating the risk-chain pattern may include, but is not limited to, updating details of existing segments, creating new segments, updating risk scores, updating risk-chain states, and so on.

In an embodiment, a new risk-chain ID is assigned to a new risk-chain to be created upon, for example, identification of events not associated with any of the existing risk-chains in the data structure 500. In another embodiment, the chain ID field 501 is used to search for matching conditions for each risk-chain. If multiple chain IDs match, the risk-chains are merged, a new chain ID field 501 is created, and only the merged risk-chain pattern is updated from this point in time and on. The segment ID field 502 is a unique ID assigned to a segment of the risk-chain pattern. The time stamp 503 marks the time of a security event that created the segment and the time the segment was last updated by a security event.

The origin phase (SDE) field 504 indicates a security phase and an SDE responsible for generating a security event associated with the segment (i.e., that created or updated the segment). The global threat type field 505 is the global threat type(s) associated with the events of that segment. The event and count field 506 is an identifier (e.g., an ID or name) of the event(s). If multiples events exist, then each event ID is summed by a counter.

The segment source field 507 is the source identification of the security event (source IP or host name). The segment destination field 508 is the destination identity of the security event (destination IP address or host name). The segment risk field 509 is the segment risk level set for a respective segment. The risk-chain state field 510 is the new state of the entire risk-chain pattern. The attack risk field 514 is a function that sets the overall attack risk level. The attack risk level is determined as a function of the number of segments, the segments' risk levels, and the cause-and-effect (C&E) counter (discussed below).

The C&E counter field 512 is an aggregate counter, associated with each source identified in the risk chain, which represents the number of cause-and-effect events that the source was responsible for. The C&E field 512 is utilized to further refine the attack risk level (field 514).

The age field 516 is the aging time of the entire risk-chain. The aging value is determined based on the risk-chain state machine. In an embodiment, certain flags can be added to the data structure 500. For example, a user name risk level related to a user name information associated with a segment may be a flag. That is, a user that is logged-in to the host that is associated with the risk chain segment would influence the segment risk level. For example, if the logged-in user is an administrator, then the risk can be set differently than if it were the actual user of the host (i.e., the owner of the PC or laptop).

It should be noted that the data structure 500 is not limited to the listed fields. The data structure 500 is extendible. Thus, other fields may be provided in addition to, or in place of, the parameters listed herein.

Figure 6:
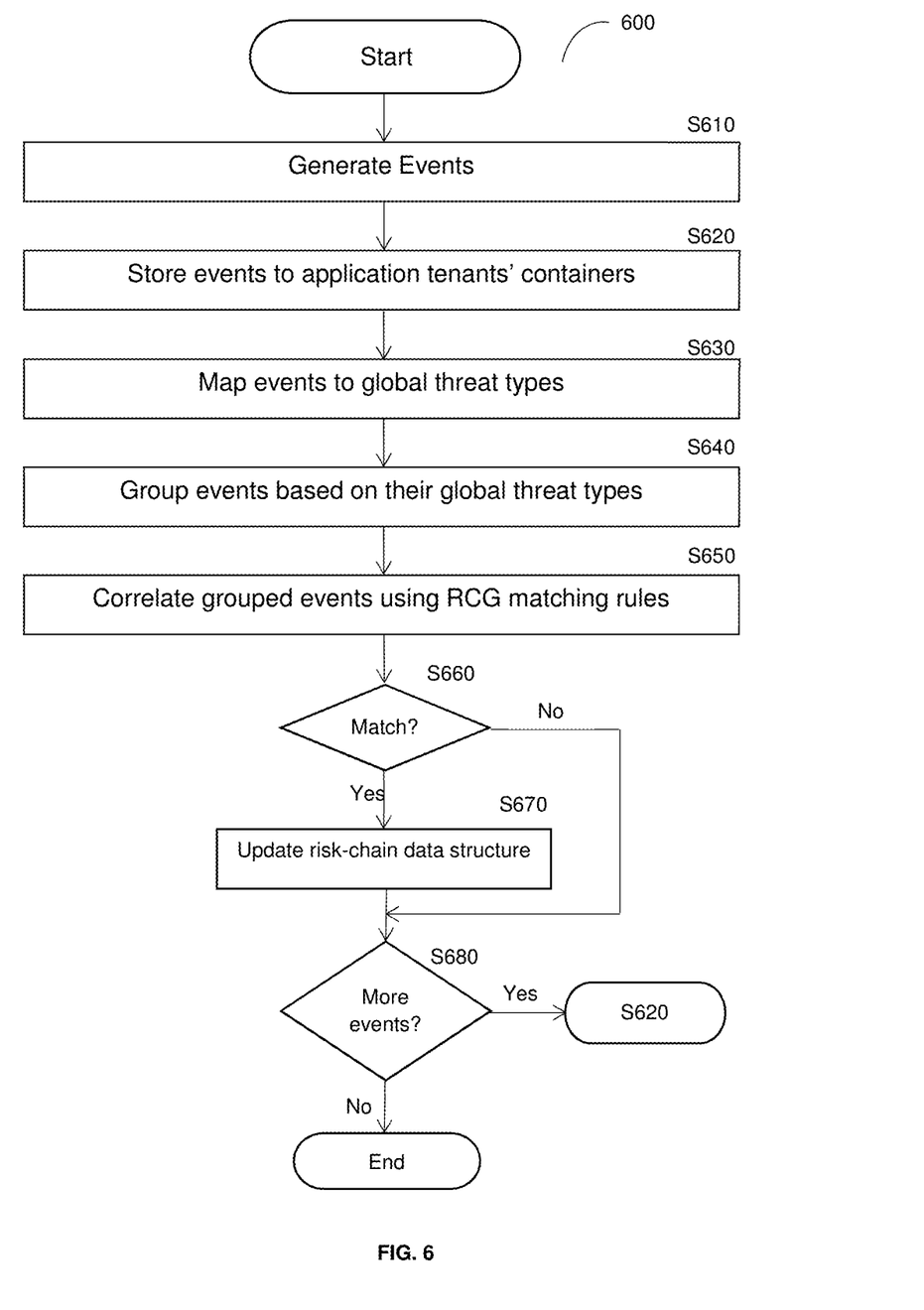
FIG. 6 illustrates a flowchart depicting a method for creating and updating risk-chains according to an embodiment.

FIG. 6 illustrates an example flowchart 600 depicting a method for creating and updating a risk-chain pattern according to an embodiment. At S610, events are generated based on the event rules and in response to signals provided by the various SDEs of the security services in response to detecting at least behavior, activity, and the like that indicate a potential attack or the usage of any monitored entity in the network.

At S620, the generated events are stored in a respective container allocated for the tenant application. In an embodiment, S620 further includes filtering, based on preconfigured filters the generated events, and distributing each of the filtered events to a respective tenant application. In an embodiment, S620 is optional. A tenant may be or may include one or more protected objects.

At S630, the events are mapped to global threat type. The mapping is performed based one or more mapping rules defined in the set of RCG rules. A global threat type may include, but is not limited to, action, propagation, control, probe, and social engineering. In an embodiment, the mapping is based on a common event type of the events. Each global threat type is further associated with a risk-chain group. The risk-chain group may include, for example, effect only, cause only, and cause-and-effect. In an example configuration, global threat types of: action, control, propagation, probe, and social engineering are respectfully associated with the following risk-chain groups: effect only, cause-and-effect, and cause only. In an embodiment, the mapping is performed using a classifier discussed above.

Optionally, at S640, events mapped to the same global threat type are grouped together.

At S650, the events mapped to the global threat types are correlated using a set of matching rules defined in the set of RCG rules. The matching rules are defined to detect any correlation between at least two events in two different global threat types or events that are repeated in the same global threat type. A matching rule includes a plurality of matching conditions. When all of the matching conditions of a matching rule are met, a segment in the risk-chain is created (or updated) and a segment risk level as well a state action for the risk chain are determined. The matching rules are discussed in greater detail above.

At S660, based on the correlation, it is checked if a match was found and, if so, execution continues with S670; otherwise, execution proceeds to S680. At S670, a data structure for maintaining the risk-chains is updated. The data structure (e.g., data structure 500) may be updated with a new risk-chain, or an existing risk-chain can be updated with a new segment created based on the correlation of events. In another embodiment, when a match exists for more than one risk chain in the data structure, a new merged risk-chain including all matching (new and existing) risk-chains is created.

At S680, it is checked if additional events have been triggered (in response to received new signals). If so execution, returns to S620; otherwise, execution terminates.

It should be noted that newly generated events are correlated (using the matching rules) to events stored in the respective tenant container. It should be further noted that the method discussed with reference to FIG. 6 is typically performed as long as events (related to a particular risk-chain) are received and processed and the respective risk-chain is not aged. At the end of the process, the risk-chain's data structure includes all information related to the created risk-chains. Specifically, as discussed above with reference to FIG. 5, each row in a data structure represents the risk chain segment's development over time.

According to certain disclosed embodiments, a risk-chain is an attack lifecycle. The attack lifecycle is monitored through a state machine including various stages of the attack and an aging mechanism of the risk-chain. The aging mechanism aims to allow discarding old and "irrelevant" risk-chains. Automatic extensions of the expiration period may be provided for risk-chains that are associated with high attack risk levels. For example, the aging mechanism may set a different age for each risk-chain based on its respective attack risk level, the global threat types involved, type of matched criteria in RCG (transition or local loop, etc.), and so on.

Figure 7:
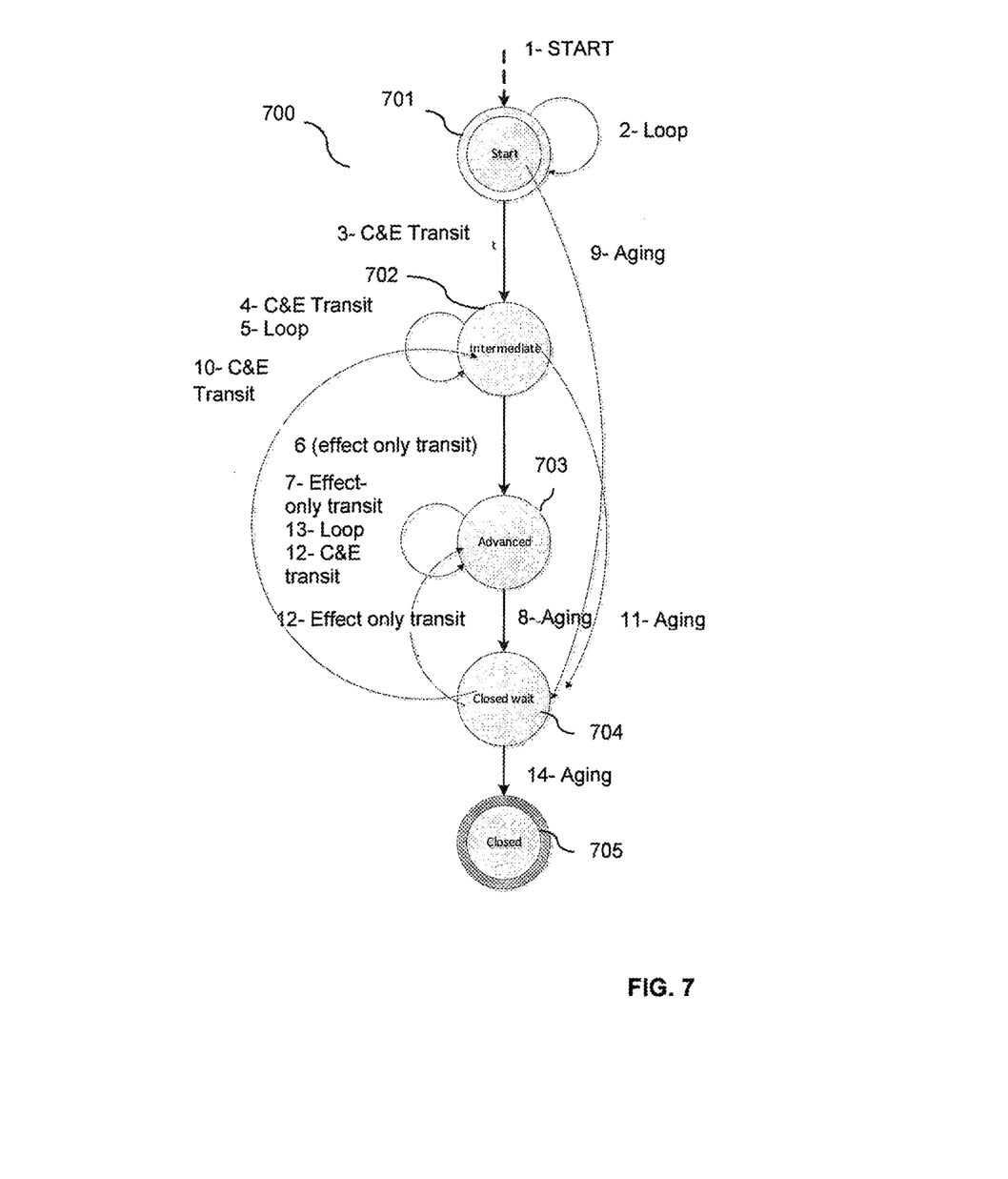
FIG. 7 is a diagram of the state machine for monitoring at an attack lifecycle according to an embodiment.

FIG. 7 shows an example diagram of a state machine 700 according to an embodiment. The state machine 700 automatically maintains an attack lifecycle.

In an embodiment, a start state 701 represents an initial stage of attack. An intermediate state 702 represents a mature attack where correlations between events are detected and, thus, cause-and-effect relationships that were detected.

An advanced state 703 represents an attack that has at least one effect-only segment. This means that the attack is in a more advanced risk stage and has reached the action global threat type (e.g., a final target of the attack). For example, in the attack lifecycle state 703, the attacker has achieved the goals of the global threat type (e.g., a data-leak, DDoS, etc.).

A closed-wait state 704 is applied before the risk-chain is closed. The state machine 700 reaches this stage when the risk-chain has not been updated for a certain period of time. In an embodiment, the closed-wait state 704 is set to a short aging period and provides limited opportunity for "recovery", i.e., only RCG rules associated with transit state are possible to be met and to update the risk chain state machine accordingly (no state loops are allowed).

The triggers that would allow transition from one state to another may be determined by a state action (defined by the matching rules) and "age" of the risk-chain. The transition triggers are designated by the numerical references (1 through 15) noted in FIG. 7 and explained in the following table (Table 3).

TABLE 3

| # | Transition Trigger | State Action | Aging |
|---|---|---|---|
| 1 | -> Start (701) | New risk chain | Initial aging |
| 2 | Start (701) -> Start (701) | Self-loop | Renew |
| 3 | Start (701) -> Intermediate (702) | Transit | Renew with factor |
| 4 | Intermediate (702) -> intermediate (702) | Transit | Renew with factor |
| 5 | Intermediate (702) -> intermediate (702) | Self-loop | Renew |
| 6 | Intermediate (702) -> Advanced | Transit | Renew with factor |
| 7 | Advanced (703) -> Advanced (703) | Transit | Renew with factor |
| 8 | Advanced (703) -> Closed-Wait (704) | Aging | Renew |
| 9 | Start (701) -> Closed-Wait (704) | Aging | Renew |
| 10 | Closed - Wait (704) -> intermediate (702) | Transit | Renew with factor |
| 11 | Intermediate (702) -> closed wait. | Aging | Renew |
| 12 | Advanced (703) -> Advanced (703) | Transit | Renew with factor |
| 13 | Advanced (703) -> Advanced (703) | Self-loop | Renew |
| 14 | Closed-Wait (704) -> Closed (705) | Aging | None |
| 15 | Closed-wait -> Advanced (703) | Matched RCG rule with an effect only event | Renew with factor |

As shown in Table 3, for each state action, the risk chain state aging is updated. In an embodiment, the value of the aging is based on the risk level, the current state (e.g., any of states 701 through 705), and a state action. The "Renew" age value is a restart the aging of the respective risk chain. The "Renew with factor" age value sets a new aging time to be longer than a default aging period.

In an embodiment, as long as the risk increases and attack becomes more "advanced" (e.g., with more segments in the respective risk-chain), the age is extended and more resources (e.g., memory) are allocated to handle the attack. On the other hand, risk-chains with a low risk level are closed earlier.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for cyber threat risk-chain generation, comprising:
    obtaining a plurality of events;
    mapping each event of the plurality of obtained events to a global threat type, wherein each global threat type is associated with a risk-chain group;

correlating among the mapped plurality of events to determine at least a transition between one global threat type to another; and updating a data structure maintaining data of at least one risk-chain, when the transition is determined, wherein the at least one risk-chain is a lifecycle of a cyber-attack.

2. The method of claim 1, wherein obtaining the plurality of events further comprises:

generating the plurality of events in response to signals received from at least one security engine;

filtering the events based on a set of predefined filters; and aggregating the plurality of events for each of at least one tenant, wherein each tenant is at least a protected object.

3. The method of claim 2, further comprising:

generating the at least one risk-chain for each tenant.

4. The method of claim 1, wherein mapping each event of the plurality of obtained events further comprises:

mapping the event to a global threat type based on at least one mapping rule.

5. The method of claim 1, wherein mapping each event of the plurality of obtained events further comprises:

mapping the event to a global threat type based on a classification model.

6. The method of claim 1, wherein the global threat type defines a certain type of malicious activity and includes at least any of: an action, a control, a propagation, a probe, and a social engineering.

7. The method of claim 6, wherein the action global threat type is associated with an effect only risk-chain group; wherein the control global threat type is associated with a cause-and-effect risk-chain group; wherein the propagation global threat type is associated with a cause-and-effect risk-chain group; wherein the probe global threat type is associated with a cause-and-effect risk-chain group; wherein the social engineering global threat type is associated with a cause-only risk-chain group.

8. The method of claim 1, wherein each of the at least one risk-chain includes at least one node and at least one segment connected thereto, wherein each of the at least one node represents a global threat type and each of the at least one segment is any of: a transition from one global threat type to another, and a self-loop in the global threat type.

9. The method of claim 8, further comprising:

determining a risk level for each segment and an attack risk level for the at least one risk-chain.

10. The method of claim 9, wherein the cyber-attack is a multi-vector attack and each node in the at least one risk-chain is a stage in the cyber-attack.

11. The method of claim 9, wherein correlating among the plurality of events further comprises:

matching each two events of the plurality of events based on at least one matching rule.

12. The method of claim 11, wherein the matching rule is a logical rule defining at least one matching condition, a segment risk level for a segment, and a state action of a segment.

13. The method of claim 11, wherein the state action is any of: transition, and self-loop.

14. The method of claim 1, wherein each of the at least one matching condition is based on at least one of: an entity type, a device type, a device group, an event order.

15. The method of claim 1, further comprising:

providing a state machine to monitor the lifecycle of the cyber-attack, wherein the state machine is realized based on the at least one risk-chain representing the cyber-attack and an aging counter.

16. The method of claim 15, wherein the state machine includes at least the following states: a start state representing an initial stage of the cyber-attack; an intermediate state representing a mature stage of the cyber-attack; an advanced state representing the cyber-attack having at least an effect-only segment in the at least risk-chain; a closed-wait state; and a closed state.

17. The method of claim 16, further comprising:

updating the aging counter based on a transition from one state to another in the state machine.

18. The method of claim 1, wherein the cyber-attack is an advanced persistent threat (APT) multi-vector attack campaign.

19. A non-transitory computer readable medium having stored thereon instructions for causing one or more processing units to execute a method, the method comprising:

obtaining a plurality of events, wherein each event is generated by a security application;

mapping each event of the plurality of obtained events to a global threat type, wherein each global threat type is associated with a risk-chain group;

correlating among the mapped plurality of events to determine at least a transition between one global threat type to another; and updating a data structure maintaining data of at least one risk-chain, when the transition is determined, wherein the at least one risk-chain is a lifecycle of a cyber-attack.

20. A system for cyber threat risk-chain generation, comprising:

a processing circuitry; and a memory, the memory containing instructions that, when executed by the processing circuitry, configure the system to:

obtain a plurality of events, wherein each event is generated by a security application;

map each event of the plurality of obtained events to a global threat type, wherein each global threat type is associated with a risk-chain group;

correlate among the mapped plurality of events to determine at least a transition between one global threat type to another; and update a data structure maintaining data of at least one risk-chain, when the transition is determined, wherein the at least one risk-chain is a lifecycle of a cyber-attack.

21. The system of claim 20, wherein the system is further configured to:

generate the plurality of events in response to signals received from at least one security engine;

filter the events based on a set of predefined filters; and aggregate the plurality of events for each of at least one tenant, wherein each tenant is at least a protected object.

22. The system of claim 21, wherein the system is further configured to:

generate the at least one risk-chain for each tenant.

23. The system of claim 20, wherein the system is further configured to:

map the event to a global threat type based on at least one mapping rule.

24. The system of claim 20, wherein the system is further configured to:

map the event to a global threat type based on a classification model.

25. The system of claim 20, wherein the global threat type defines a certain type of malicious activity and includes at least any of: an action, a control, a propagation, a probe, and a social engineering.

26. The system of claim 25, wherein the action global threat type is associated with an effect only risk-chain group; wherein the control global threat type is associated with a cause-and-effect risk-chain group; wherein the propagation global threat type is associated with a cause-and-effect risk-chain group; wherein the probe global threat type is associated with a cause-and-effect risk-chain group; wherein the social engineering global threat type is associated with a cause-only risk-chain group.

27. The system of claim 20, wherein each of the at least one risk-chain includes at least one node and at least one segment connected thereto, wherein each of the at least one node represents a global threat type and each of the at least one segment is any of: a transition from one global threat type to another, and a self-loop in the global threat type.

28. The system of claim 27, wherein the system is further configured to:
determine a risk level for each segment and an attack risk level for the at least one risk-chain.

29. The system of claim 28, wherein the cyber-attack is a multi-vector attack and each node in the at least one risk-chain is a stage in the cyber-attack.

30. The system of claim 28, wherein the system is further configured to:
match each two events of the plurality of events based on at least one matching rule.

31. The system of claim 30, wherein the matching rule is a logical rule defining at least one matching condition, a segment risk level for a segment, and a state action of a segment.

32. The system of claim 30, wherein the state action is any of: transition, and self-loop.

33. The method of claim 20, wherein each of the at least one matching condition is based on at least one of: an entity type, a device type, a device group, an event order.

34. The system of claim 20, wherein the system is further configured to:
provide a state machine to monitor the lifecycle of the cyber-attack, wherein the state machine is realized based on the at least one risk-chain representing the cyber-attack and an aging counter.

35. The system of claim 34, wherein the state machine includes at least one state, wherein the at least one state includes: a start state representing an initial stage of the cyber-attack; an intermediate state representing a mature stage of the cyber-attack; an advanced state representing the cyber-attack having at least an effect-only segment in the at least risk-chain; a closed-wait state; and a closed state.

36. The system of claim 35, wherein the system is further configured to:
update the aging counter based on a transition from one state to another in the state machine.

37. The system of claim 20, wherein the cyber-attack is an advanced persistent threat (APT) multi-vector attack campaign.

* * * * *